(12) United States Patent
Müller

(10) Patent No.: US 6,490,461 B1
(45) Date of Patent: Dec. 3, 2002

(54) POWER CONTROL BASED ON COMBINED QUALITY ESTIMATES

(75) Inventor: Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/344,121

(22) Filed: Jun. 24, 1999

(51) Int. Cl.⁷ ................................................. H04Q 7/20
(52) U.S. Cl. ........................ 455/522; 455/245.1; 455/69
(58) Field of Search ..................... 455/522, 63, 67.1, 455/67.3, 226.1, 226.2, 226.3, 423, 550, 560, 561, 245.1, 69; 375/221–227

(56) References Cited

U.S. PATENT DOCUMENTS

| | | | | |
|---|---|---|---|---|
| 5,794,129 A | * | 8/1998 | Komatsu | 455/69 |
| 5,933,782 A | * | 8/1999 | Nakano et al. | 455/522 |
| 6,108,374 A | * | 8/2000 | Balachandran et al. | 375/227 |
| 6,154,659 A | * | 11/2000 | Jalai et al. | 455/522 |
| 6,173,162 B1 | * | 1/2001 | Dahlman et al. | 455/69 |
| 6,185,432 B1 | * | 2/2001 | Vembu | 455/522 |
| 6,212,399 B1 | * | 4/2001 | Kumar et al. | 455/522 |
| 6,259,927 B1 | * | 7/2001 | Butovitsch et al. | 455/522 |

FOREIGN PATENT DOCUMENTS

| | | |
|---|---|---|
| EP | 0 715 423 A | 6/1996 |
| EP | 0 853 393 A | 7/1998 |
| EP | 0 854 588 A | 7/1998 |
| WO | WO 98 58461 A | 12/1998 |

OTHER PUBLICATIONS

Rappaport, Theodore. "Wireless Communications: Princliples and Practice" sec. 10.4.2.5. p 525.*

* cited by examiner

Primary Examiner—Edward F. Urban
Assistant Examiner—Charles Craver
(74) Attorney, Agent, or Firm—Nixon & Vanderhye

(57) ABSTRACT

A wireless telecommunications system is described in which mobile station power control is affected by a functional combination of signal-to-interference sampling, bit error rate sampling, and frame error rate sample. The signal-to-interference sampling provides rapid power control adjustment, while the bit error rate and frame error rate factors provide less speedy but better power control adjustment. The power control function has applicability in single link and multiple link power control adjustments.

21 Claims, 4 Drawing Sheets

POWER CONTROL BASED ON COMBINED QUALITY ESTIMATES

FIELD OF THE INVENTION

The present invention relates to wireless communication systems, and more particularly, to a method and apparatus for efficiently controlling power levels in a mobile radio.

BACKGROUND AND SUMMARY OF THE INVENTION

In a typical cellular radio system, a geographical area is divided into cell areas served by base stations which are connected to a radio network. Each user (mobile subscriber) in the cellular radio system is provided with a portable, pocket, hand-held, or car mounted mobile station which communicates voice and/or data with the mobile network. Each base station includes a plurality of channel units including a transmitter, a receiver, and a controller and may be equipped an omni-directional antenna for transmitting equally in all directions or with directional antennas, each directional antenna serving a particular sector cell. Each mobile station also includes a transmitter, a receiver, a controller, and a user interface and is identified by a specific mobile station identifier. Each mobile subscriber is identified by another identifier, e.g., an international mobile subscription number (IMSI).

The present invention is described in the non-limiting, example context of a universal mobile telecommunications (UMTS) 10 shown in FIG. 1. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to corresponding service nodes 16. The PSTN/IDSN connection-oriented network 12 is connected to a connection-oriented service node shown as a Mobile Switching Center (MSC) node 18 that provides circuit-switched services. In the existing GSM model, the MSC 18 is connected over an interface A to a Base Station Subsystem (BSS) 22 which in turn is connected to radio base station 23 over interface A'. The Internet connectionless-oriented network 14 is connected to a General Packet Radio Service (GPRS) node 20 tailored to provide packet-switched type services sometimes referred to as the serving GPRS service node (SGSN). Each of the core network service nodes 18 and 20 connects to a UMTS Terrestrial Radio Access Network (UTRAN) 24 over a radio access network (RAN) interface. UTRAN 24 includes one or more radio network controllers 26. Each RNC 26 is connected to a plurality of base stations (BS) 28 and to any other RNCs in the UTRAN 24.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality.

The mobile stations 30 use transmission codes so base station 28 can identify transmissions from that particular MS 30. In the current WCDMA standard, codes are supposed to be allocated as follows for the dedicated channels:

a) the uplink and downlink transmission is using channelization codes, and on top of that a scrambling code;

b) the channelization code determines e.g., the spreading factor, and the spreading factor determines the maximum bitrate;

c) mobiles in the same cell using the same frequency and the same spreading factor use different channelizations codes for the downlink channels but the same scrambling code; and d) mobiles in other cells use the same channelization codes but different scrambling codes.

The scrambling codes secure the integrity, between downlink transmissions using the same channelization code but in different cells. The scrambling code used in uplink secure the integrity between uplink transmissions from different mobile stations in the same or in other cell.

Thus, the MS gets its own scrambling code while the BS transmission to a specific mobile on a dedicated channel will use a common scrambling code but a unique channelization code. The MS have the ability to combine a downlink transmission using a different scrambling codes and different channelization codes (one limitation today is that the spreading factor of the channelization codes must be the same from all cells).

The radio network controller 26 and base station 28 shown in FIG. 2 are radio network nodes that each include a corresponding data processing and control unit 32 and 33 for performing numerous radio and data processing operations required to conduct communications between the RNC 26 and the mobile stations 30. Part of the equipment controlled by the base station data processing and control unit 33 includes plural radio transceivers 34 connected to one or more antennas 35. The mobile station 30 shown in FIG. 3 also includes a data processing and control unit 36 for controlling the various operations required by the mobile station. The mobile's data processing and control unit 36 provides control signals as well as data to a radio transceiver 37 connected to an antenna 38.

The present invention may be employed in the context of the example mobile communications system 10 shown in FIG. 1 in which the radio network controllers 26 and base stations 28 form a radio access network between a core network node (like the MSC 16) and the mobile stations 30.

It is important for the mobile stations 30 to maintain appropriate power levels when communicating with the base station 28 in order to prevent one mobile station from overwhelming communications from other mobile stations in the transmission area. Because the power level for mobile stations is a critical parameter for maintaining good communication quality within a particular cell, is valuable for power control to be performed as often as possible. Ideally, each mobile station is continually monitored to ensure that its power levels are high enough to provide good transmission quality yet no higher than necessary to provide that transmission quality and no higher than will create unreasonable interference with other mobile station communications. The invention also applies to maintenance of proper power level in the base station transmission.

In prior systems, very fast power control of mobile station communications was typically performed by the network in FIG. 1 using signal-to-interference ($E_b/I_o$) measurements. The signal-to-interference measurements were typically performed over a couple of pilot symbols contained in each slot. The measured $E_b/I_o$ for the uplink slot is compared to a target and Transmission Power Control ("TPC") bits in the next downlink slot are set to order a one step increase or decrease of the mobile station power.

Although signal-to-interference measurements can be made very rapidly, and therefore, are useful in fast power control, varying and different propagation conditions cause the $E_b/I_o$ parameter to be less than accurate in determining whether a mobile station should be commanded to increase or decrease its transmit power. There are several possible reasons for this inaccuracy:

If the $E_b/I_o$ is changing too fast, e.g., due to a fast moving mobile, the power control delay will be too large and the power adjustment wvill come too late to be able to counteract the changed $E_b/I_o$.

Also, the measured $E_b/I_o$ estimate will not be valid for the whole slot since the true $E_b/I_o$ changes during non-measured time periods during a slot.

The radio propagation conditions, e.g., rapid variation in the number of radio paths used, will affect the $E_b/I_o$ estimate in a negative manner.

In addition to the inaccuracy of the $E_b/I_o$ based power control, the $E_b/I_o$ estimate's inability to reflect the true, end user perceived quality also creates a problem. The end-user perceived quality is more accurately estimated by using estimated frame error rate.

To increase accuracy, it has been proposed that frame error rate (FER) be used as a more accurate power control parameter. Frame error rates identify the accuracy of frame transmissions and are good indicators of power control. Unfortunately, FER parameters are slowly calculated so power control is not quickly achieved using FER as a measurement.

To illustrate this difference, FIG. 4 shows a WCDMA frame protocol. Each mobile station MS communicates with a base station BS using the WCDMA frame protocol shown. The uplink physical control channel is used to carry control information including known pilot bits to support channel estimation for coherent detection, transmit power-control (TPC) commands, feedback information (FBI), and an optional transport-format combination indicator (TFCI). The transport-format combination indicator informs the receiver about the instantaneous parameters of the different transport channels multiplexed on the uplink channel, and corresponds to the data transmitted in the same frame.

FIG. 4 shows the frame structure of the uplink dedicated physical channels. Each frame of length 10 ms is split into 16 slots, each of length $T_{slot}=0.625$ ms, corresponding to one power-control period. A super-frame corresponds to 72 consecutive frames, i.e., the super-frame length is 720 ms.

Controlling the power level between the mobile station MS and the base station BS is a continual process. If it is done bit-by-bit (or symbol-by-symbol), in accordance with the $E_b/I_o$ formula, the mobile station will receive very fast power control correction, but such corrections may not be particularly accurate. For the example embodiment of FIG. 4, each frame of 10 millisecond duration includes 16 slots, so an $E_b/I_o$ measurement each slot yields an $E_b/I_o$ value correction every 0.625 milliseconds to adjust power by a predetermined increment (for example, 1 dB). On the other hand, if a frame error rate is used, power control is better able to maintain a desired end user perceived quality during semi-static conditions, but occurs too slowly since just one frame error determination requires at least the 10 ms needed to receive the frame. For a fast moving mobile station, slow power correction can cause a significant problem where the mobile continually ends up in high power/low power conditions which remain uncorrected for significant durations. In addition, the proximity of the estimated $E_b/I_o$ to the true $E_b/I_o$ changes with changing radio conditions, as does the mapping between $E_b/I_o$ and end user quality—both of which are effected by first moving mobiles.

Consequently, $E_b/I_o$ provides fast power control, but is not particularly accurate at determining appropriate power conditions for subsequent transmissions. Frame error rates provide more accurate power control, but occur too slowly. The present invention utilizes a function determined by $E_b/I_o$ (fast but less accurate), bit error rate BER (slower but more accurate), and FER (still slower but still more accurate) as a method of determining power control. The present invention applies equally to single links and plural links (soft handovers). The present invention also applies to both/either power control of base station transmitters and/or mobile station transmitters. Thus, although the present description is provided by reference to power control of the uplink (ISS transmitter), the invention covers and applies to power control of the downlink (base station transmitter) as well.

BRIEF DESCRIPTION OF THE DRAWINGS

The foregoing and other objects, features, and advantages of the invention will be apparent from the following description of preferred embodiments as well as illustrated in the accompanying drawings in which reference characters refer to the same parts throughout. While individual functional blocks and components are shown in many of the figures, those skilled in the art will appreciate that these functions may be performed by individual hardware circuits, by a suitably programmed digital microprocessor, by an application specific integrated circuit (ASIC), and/or by one or more digital signaling processors (DSPs).

DETAILED DESCRIPTION OF THE DRAWINGS

In the following description, for purposes of explanation and not limitation, specific details are set forth, such as particular embodiments, data flows, signaling implementations, protocols, techniques, etc., in order to provide an understanding of the present invention. However, it will be apparent to one skilled in the art that the present invention may be practiced in other embodiments that depart from these specific details. For example, the invention applies to MS power control and to BS power control. Instead of BER, other signal processing related parameters can be used e.g., soft information from Viterbi decoding, etc. In some instances, detailed descriptions of well-known methods, interfaces, devices, and signaling techniques are omitted so as not to obscure the description of the present invention with unnecessary detail.

Figure 1:
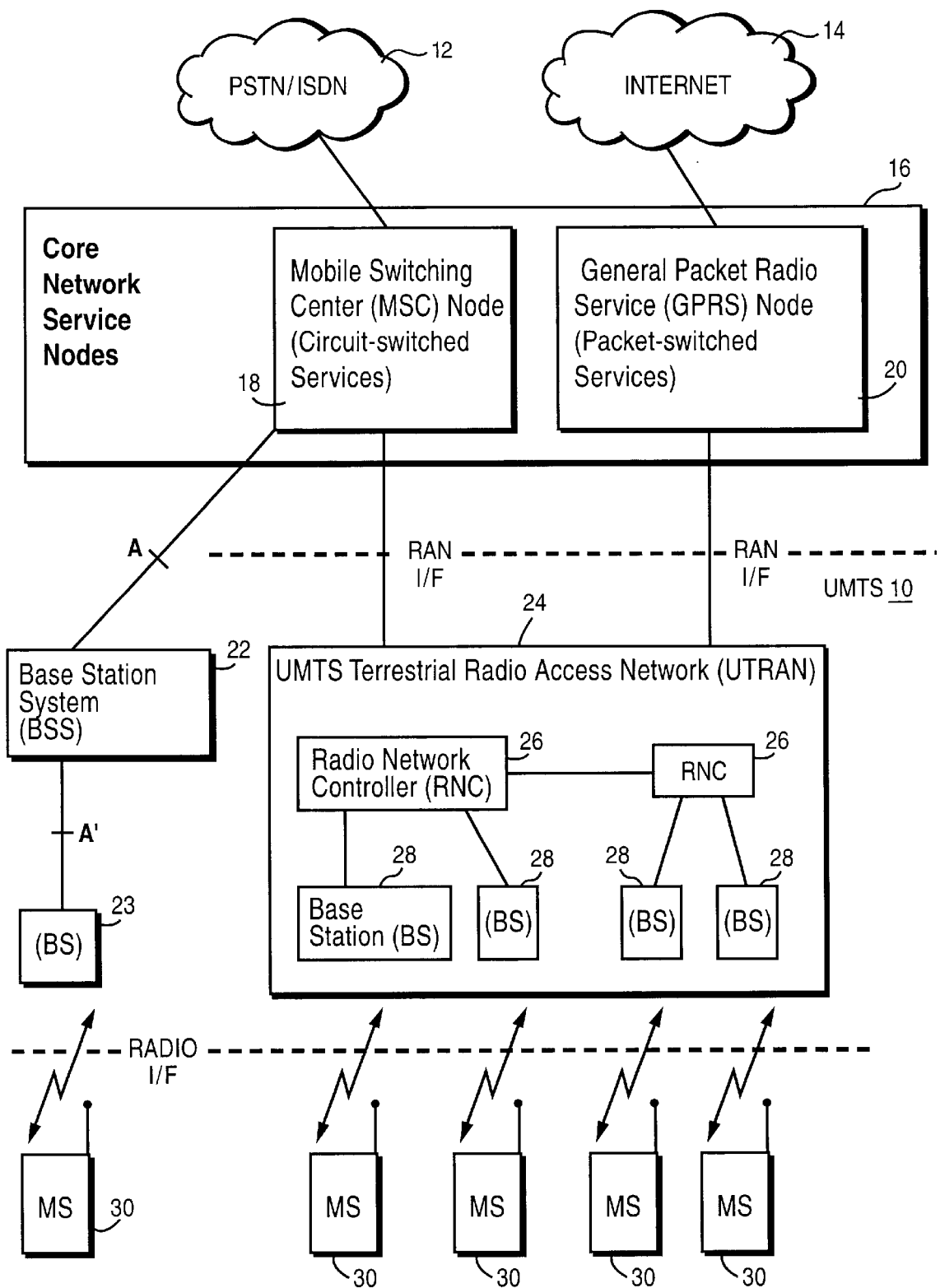
FIG. 1 illustrates an example mobile communications system in which the present invention may be employed.
Figure 2:
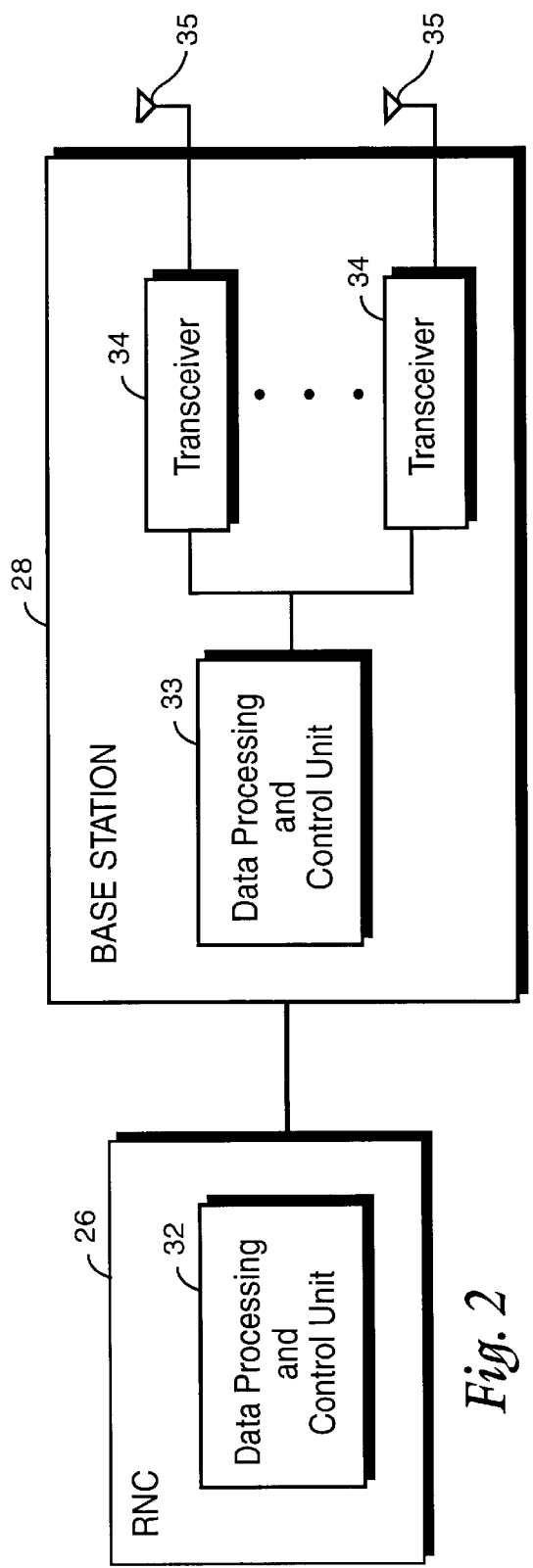
FIG. 2 is a function block diagram of a base station shown in FIG. 1.
Figure 3:
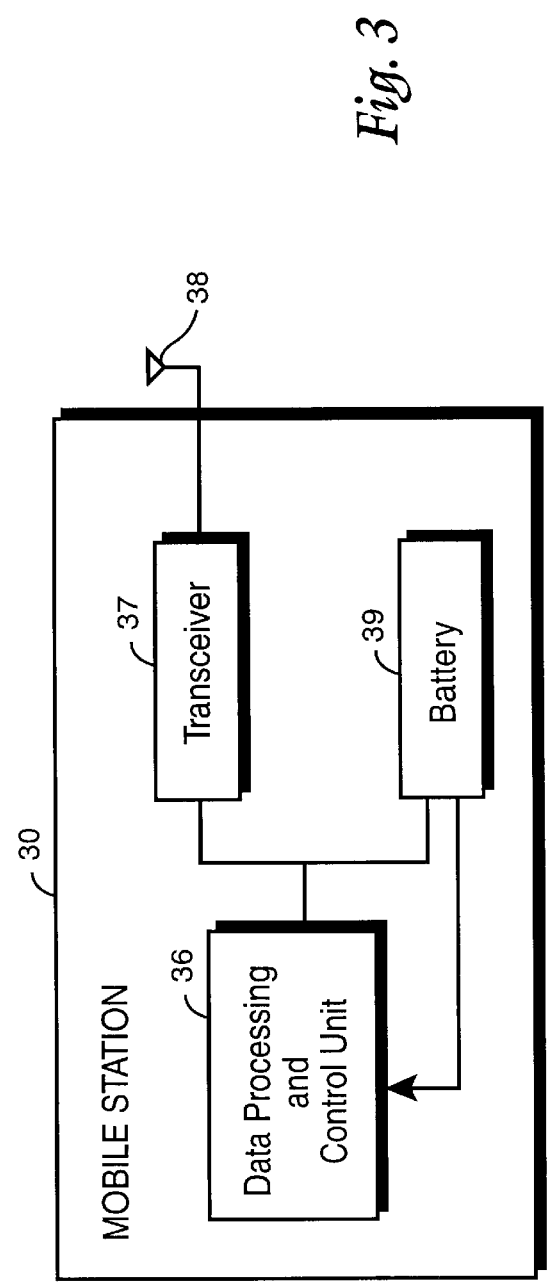
FIG. 3 is a function block diagram of a mobile station shown in FIG. 1.
Figure 4:
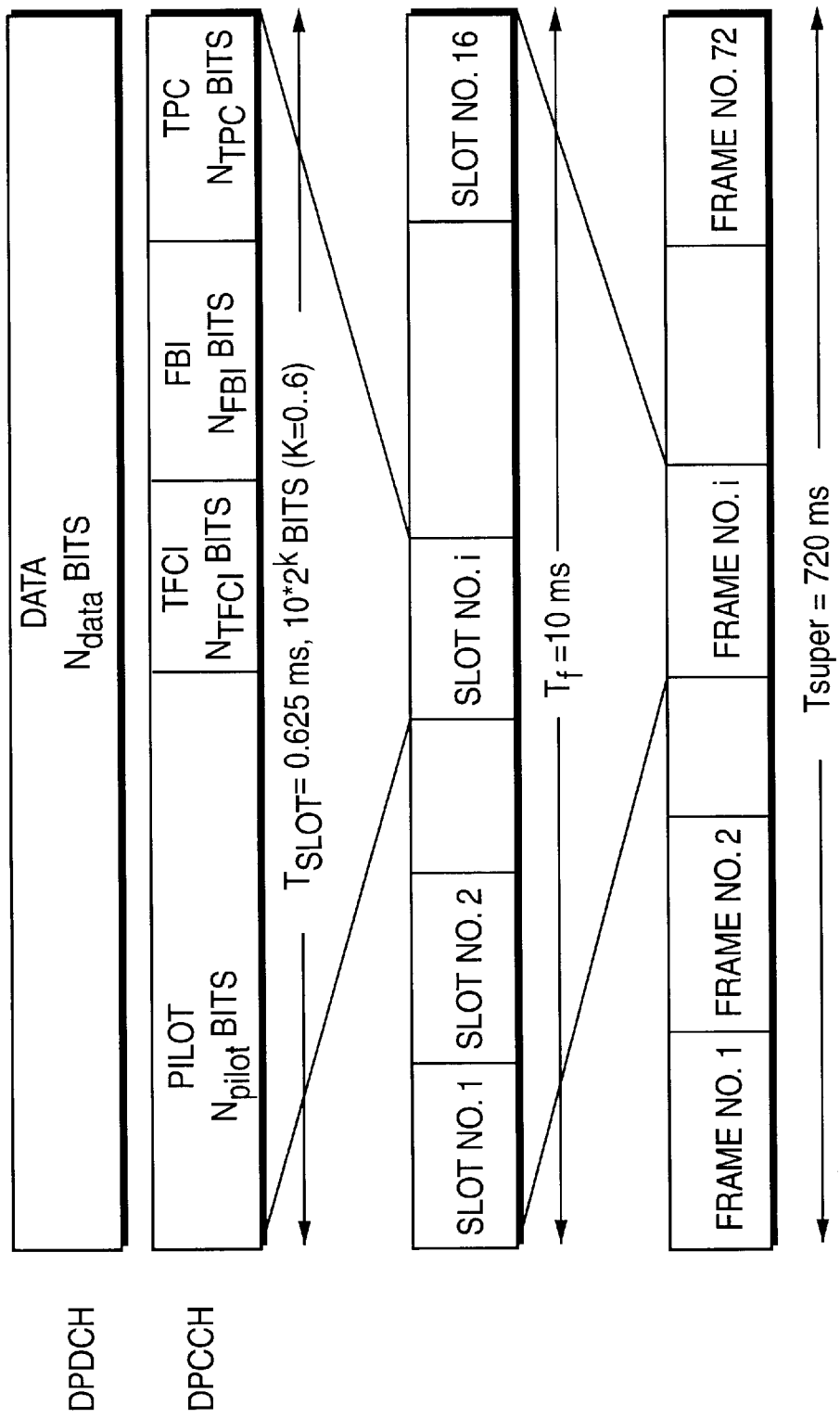
FIG. 4 is an example WCDMA transmission frame protocol.
Figure 5:
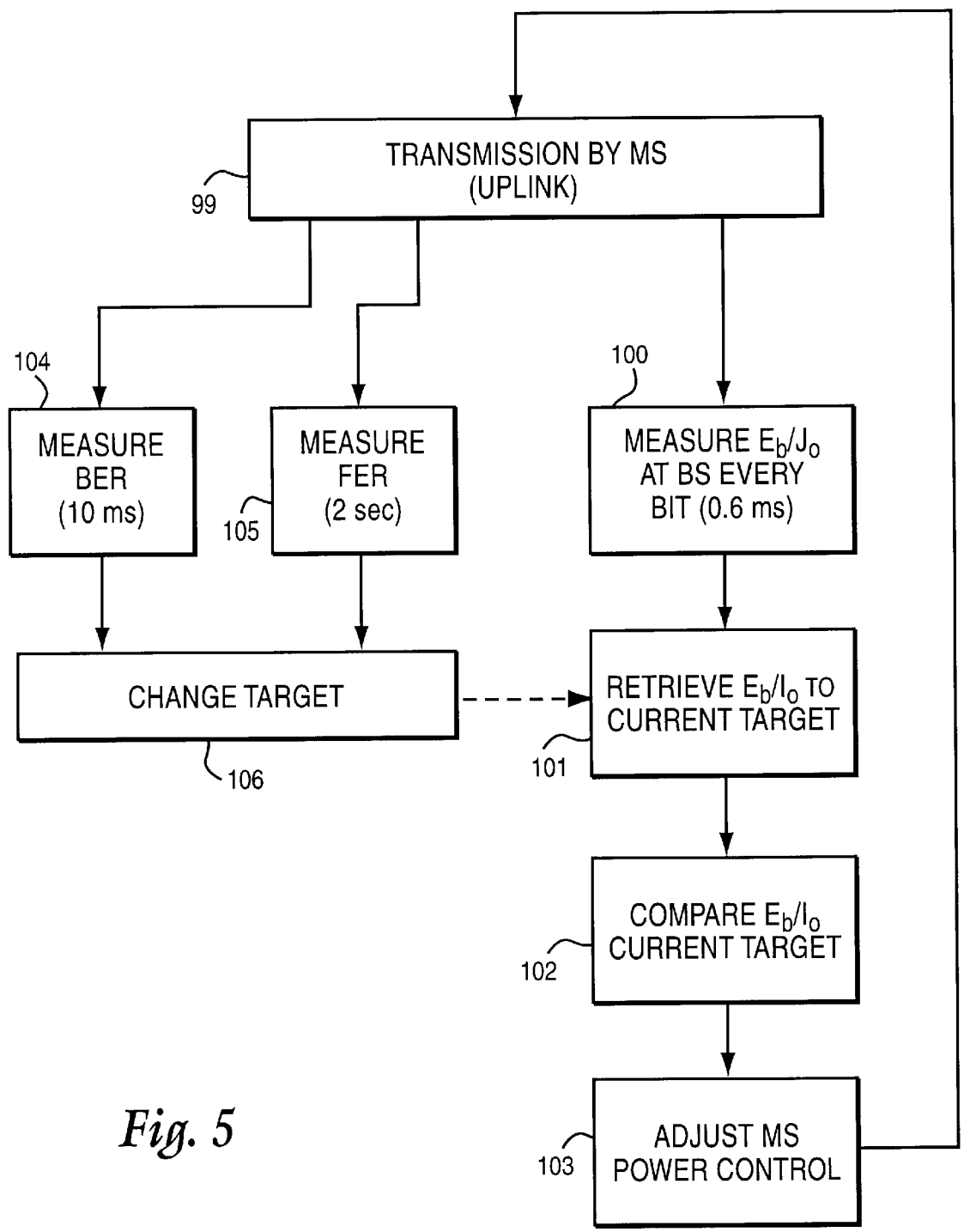
FIG. 5 illustrates in flowchart form an example routine performed in accordance with an example embodiment of the present invention.

The process of adjusting the mobile station power is illustrated in an example embodiment in FIG. 5. There, a transmission by a mobile station occurs at step 99. At step 100, $E_b/I_o$ signal-to-interference measurements are taken at the base station usually on the pilot symbols in each slot. This sampling occurs very fast (on the order of 0.625 milliseconds per total measurements), providing a fast power correction measurement. At step 101, a target $E_b/I_o$ is retrieved. At step 102, the retrieved $E_b/I_o$ target figure is compared with the $E_b/I_o$ measurement taken at step 100. At step 103, mobile station power control is adjusted based on the comparison made at step 102.

According to the present invention, the mobile station (MS) transmits power according to: MS (TX power)=f(FER, $E_b/I_o$, BER). Similarly, the base station (BS) may transmit power according to: BS (TX power)=f(FER, $E_b/I_o$, BER)

In the example embodiment of FIG. 5, the power correction measurement step 103 is influenced by slower, but more accurate, bit error rate (BER) and frame error rate (FER) measurements at steps 104–106. At step 104, BER is measured from a sampling of the transmission of step 99. Each BER sample is measured approximately every 10 milliseconds, and thus occurs more slowly than the step 100, which occurs approximately every 0.625 milliseconds. Further, the FER measured at step 105 reflects the perceived end user quality, but occurs only every 2 seconds. The results of the BER measurement and FER measurement at steps 104 and 105 are compared to target BER and FER values, and the comparison is used to modify the target $E_b/I_o$ figure at step 106. The target change at step 106 will change as soon as there is new information on BER or FER, i.e., in the example described, every frame. However, the typical average target change frequency is expected to be much slower and will thus occur more slowly than the constant $E_b/I_o$ measurements of step 100. Thus, the target changed at step 106 is stored and becomes the new "current target" employed at step 101 following the next subsequent measurement of $E_b/I_o$ at step 100.

FER measurements can follow standard kinds of frame error rate measurements including, for example, CRC calculation and comparisons. If the CRC does not match, a frame error is recorded. A predetermined number of consecutive frame errors (or some other protocol of repetitious frame errors) indicates inadequate transmission power. CRC errors affect the $E_b/I_o$ target at step 106, typically, but may also directly cause a power increase order to be issued. Accordingly, at step 103, the mobile station may be instructed to increase transmission power by some increment, e.g., 1 dB.

Of course FER is not a good indication by itself of when to reduce power because a series of consecutive good frame recoveries (no frame errors) does not necessarily indicate that mobile station power can be reduced. Consequently, at step 104, a received number of bits in a frame is compared with a known number reported in a time slot field. The number of bit errors is divided by the time slot (10 milliseconds) to determine BER for every 10 milliseconds. This BER figure is compared with a target at step 104 to determine adjustments to $E_b/I_o$ target at 106. One skilled in the art will recognize that hysteresis analysis and standard deviation analysis of BER recoveries may also be useful statistical analyses in determining the target change at 106. Because one transport block is sent every frame and the transport block is fault detected by a CRC, the data contained in the transport block is error corrected by forward error correction coding (FEC). Thus, the BER will typically be produced at step 104 once every frame. The following steps can estimate the BER:

1. Save the received transport block,
2. Use FEC to error correct the bits errors of the FEC bits
3. Check the CRC on the decoded block
4. IF CRC=OK use the same operation as the transmitting side to FEC the data back to the encoded form.
5. Compare the stored data in 1 with the encoded data in 4
6. The number of bits that differ in 5 is the number of bits received with an error.
7. The BER is the number of bit errors in 6 divided by the total number of FEC data bits in the original transport block.

In the example of step 104, a frame of time slots (10 milliseconds) is employed but some number greater or less than a frame of time slots may be more or less advantageous depending upon the circumstances.

Similarly, the FER measurement at step 105 will occur every 10 milliseconds (1 per frame), but one FER calculation is not statistically accurate, so one must average multiple frames. In the example of step 105, two seconds of frames may be employed. Of course, more or less number of frames may be used in the statistical sampling depending upon the quality of service specified. For example, a 10% FER quality of service can be obtained with the two seconds of statistical sampling shown in step 105. Alternatively, a 1% FER quality of service can be determined by extending the sample to 5 to 10 second statistical sampling intervals.

Although the use of the BER and FER measurements in 104 and 105 is not particular to the present invention in terms of how the $E_b/I_o$ target is changed in step 106, one method of determining the $E_b/I_o$ target change at step 106 is to compare the respective BER and FER measurements at steps 104 and 105 to predetermined target BER and FER values. Hysteresis analysis can be used to determine the difference between the measured BERs/FERs in steps 104 and 105 and the target BER/FERs. That is, the size of the increments in the target change of step 106 depends on the speed of the loops identified in the hysteresis analysis comparing the measured BERs/FERs with the target BERs/FERs in steps 104 and 105. Faster loops yield smaller target increments at step 106, while slower loops yield larger increments at step 106. Further, magnitude changes in BER to target BER and FER to target FER will also be indicative of the target change at step 106.

If multiple radio links are employed, for example between one mobile station and multiple base stations, the example embodiment of the present invention takes into account the FER values on each link. In this instance, the targets are adapted for each link due to the fact that one or several links are being combined. By being able to use FER and BER targets per link, the $E_b/I_o$ target adjustments can be done locally and do not have to be sent over the interface between the radio network controller (RNC) and the base stations. Since target adjustments can be frequent, this will save transmission capacity.

It is assumed that the RNC makes the final combination of radio links. If only one link is used, the FBR target for that link Is the same target as after combining, and the BER target matches also the typical BER that gives the wanted FER. If two links are used, the FER and BER targets used for each link are adapted so the FER and BER targets will typically be increased to account for the positive effect of combination.

For example, if a total FER after combination of 10% is required and the connection is using one link, this is also the FER target used by the base station. If two links are used and the FER on the links are independent, the FER target for each link can typically be adjusted to:

$$0.1^{0.5}=0.32=32\%$$

Since the FFR on each link is probably dependent, there is also a need to look at the combined FER and adjust the individual FFR targets accordingly, but these adjustments are expected to be infrequent.

While the present invention has been described in the above example embodiment with respect to uplink information transmissions by the mobile station, the present invention can provide equal applicability through measurement of downlink information from the base station to the mobile station.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Radio power control circuitry providing transmission power control for a connection between a radio network and a mobile radio station, comprising:
    a first power control loop, operating on a first time scale, for estimating a signal-to-interference ratio for a communications channel, comparing the estimated signal-to-interference ratio to a target signal-to-interference ratio to produce a signal-to-interference ratio difference, and generating a power control command for transmitting a signal over the communications channel based on the signal-to-interference ratio difference;
    a second power control loop, operating on a second time scale slower than the first time scale, for estimating a bit error rate for the communications channel, comparing the estimated bit error rate with a target bit error rate to produce a bit error rate difference, and updating the target signal-to-interference ratio based on the bit error rate difference; and
    a third power control loop, operating on a third time scale slower than the second time scale, for estimating a frame error rate for the communications channel, comparing the estimated frame error rate with a target frame error rate to produce a frame error rate difference, and updating the target signal-to-interference ratio based on the frame error rate difference.

2. The radio station power control circuitry in claim 1, wherein the first time scale corresponds to the duration of a time slot.

3. The radio station power control circuitry in claim 1, wherein the second time scale corresponds to the duration of a frame including one or more time slots.

4. The radio station power control circuitry in claim 1, wherein the third time scale corresponds to the duration of two frames, each of which includes one or more time slots.

5. The radio station power control circuitry in claim 1, wherein the signal-to-interference ratio is determined approximately for every pilot symbol transmitted by the mobile radio.

6. The radio station power control circuitry in claim 1, wherein the bit error rate is determined approximately for every frame transmitted by the mobile radio.

7. The radio station power control circuitry in claim 1, wherein each frame includes a code indicator and the frame error rate is determined by a comparison of actual CRC mismatches to a predetermined mismatch frequency threshold.

8. The radio station power control circuitry in claim 1, wherein the connection is supported by plural radio links, the circuitry further including first, second, and third power control loops corresponding to each radio link, each power control loop adjusting the signal to interference ratio target for its corresponding radio link.

9. The radio station power control circuitry in claim 8, wherein the bit error rate target for each radio link and the frame error rate target for each link are modified to take in account an effect of combining signals from each radio link associated with the connection.

10. The radio station power control circuitry in claim 1, wherein the radio station power control circuitry is included in a mobile radio.

11. The radio station power control circuitry in claim 1, wherein the radio station power control circuitry is included in the radio network.

12. A transmission power control method for a communication between a mobile radio station and a telecommunications network, comprising:
    in a first power control loop operating on a first time scale, estimating for a communications channel a received signal-to-interference ratio,
    a receive channel bit error rate on a second time scale longer than the first time scale, comparing the estimated signal-to-interference ratio to a signal-to-interference ratio target to produce a signal-to-interference ratio difference, and generating a power control command for transmitting a signal over the communications channel based on the signal-to-interference ratio difference;
    in a second power control loop, operating on a second time scale slower than the first time scale, estimating a bit error rate for the communications channel, comparing the estimated bit error rate with a target bit error rate to produce a bit error rate difference, and updating the signal-to-interference ratio target based on the bit error rate difference;
    in a third power control loop, operating on a third time scale slower than the second time scale, for estimating a frame error rate for the communications channel, comparing the estimated frame error rate with a target frame error rate to produce a frame error rate difference, and updating the signal-to-interference ratio target based on the frame error rate difference.

13. The method in claim 12, wherein the first time scale corresponds to the duration of a time slot.

14. The method in claim 12, wherein the second time scale corresponds to the duration of a frame including one or more time slots.

15. The method in claim 12, wherein the third time scale corresponds to the duration of at least two frames, each of which includes one or more time slots.

16. The method in claim 12, wherein the signal-to-interference ratio is determined approximately for every pilot symbol transmitted by the mobile radio.

17. The method in claim 12, wherein each frame includes a CRC indicator and the frame error rate is determined by a comparison of actual CRC mismatches to a predetermined mismatch frequency threshold.

18. The method in claim 12, wherein the connection is supported by plural radio links, the circuitry further including first, second, and third power control loops corresponding to each radio link, each power control loop adjusting the signal to interference ratio target for its corresponding radio link.

19. The method in claim 18, wherein the bit error rate target for each radio link and the frame error rate target for each link are modified to take in account an effect of combining signals from each radio link associated with the connection.

20. The method in claim 12 implemented in the mobile radio.

21. The method in claim 12 implemented in the radio network.

* * * * *